Figure 1:
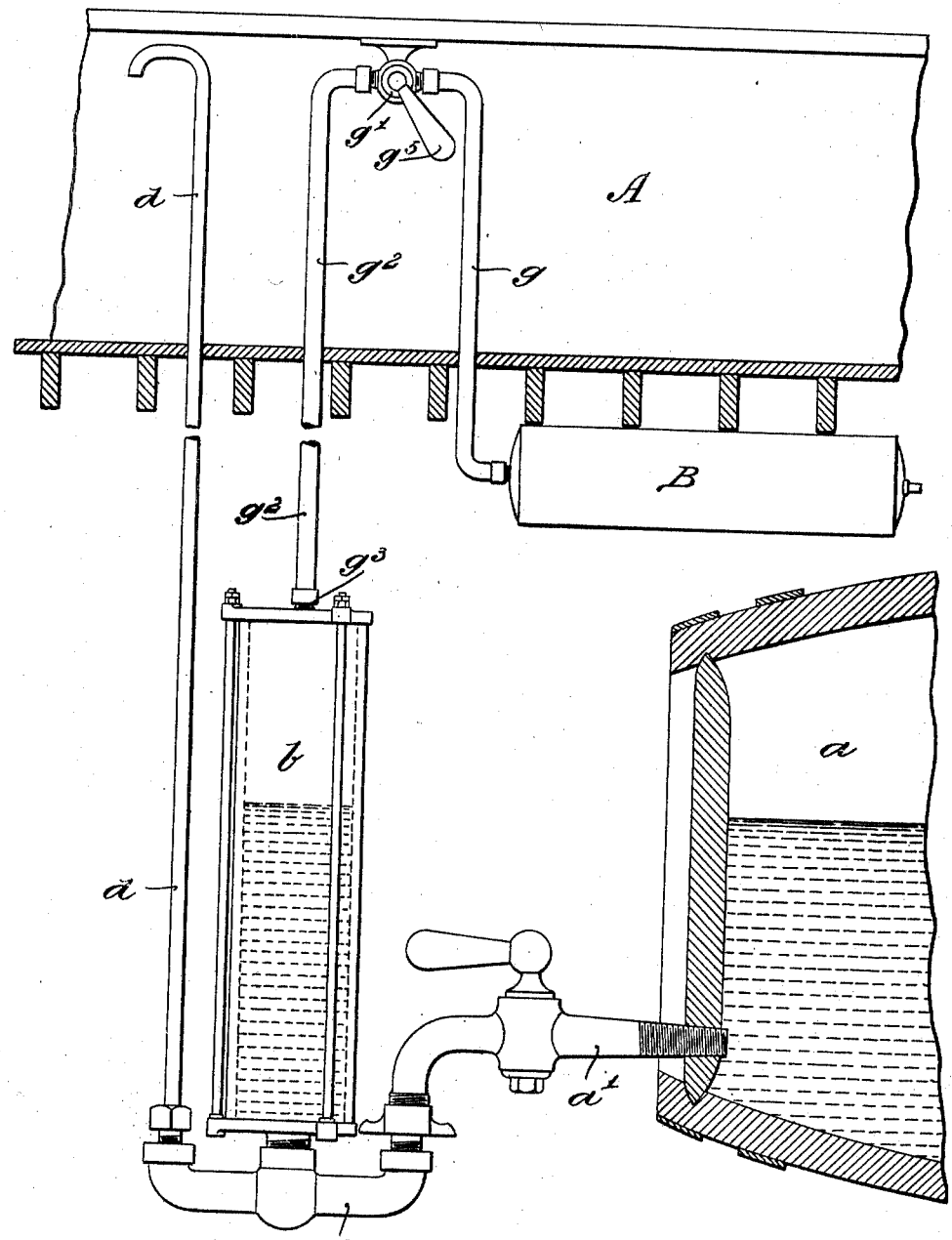

No. 759,827. PATENTED MAY 10, 1904.
W. A. F. McCALLUM.
APPARATUS FOR DRAWING LIQUIDS.
APPLICATION FILED JAN. 13, 1904.
NO MODEL. 2 SHEETS—SHEET 1.

No. 759,827. PATENTED MAY 10, 1904.
W. A. F. McCALLUM.
APPARATUS FOR DRAWING LIQUIDS.
APPLICATION FILED JAN. 13, 1904.
NO MODEL. 2 SHEETS—SHEET 2.
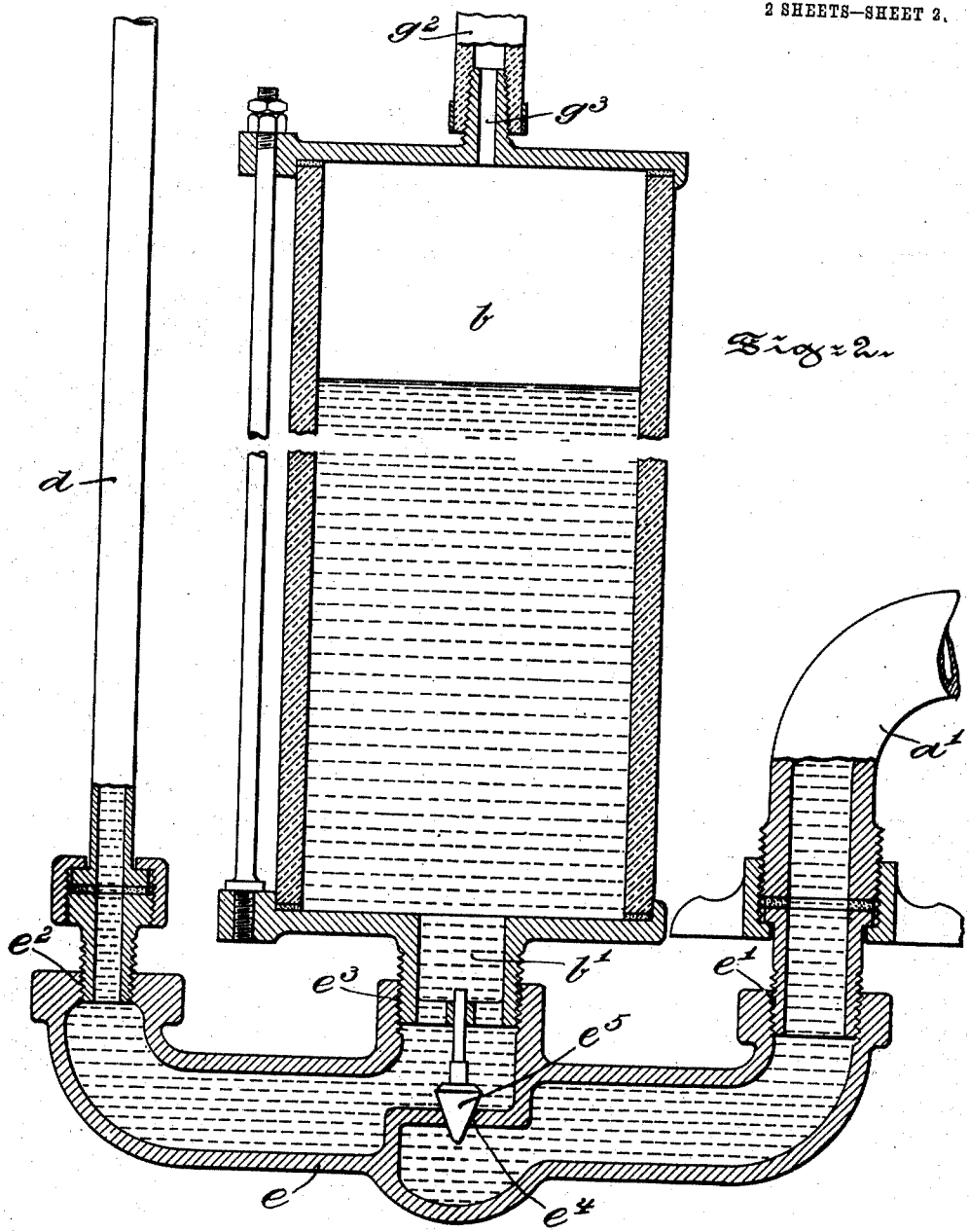

No. 759,827. Patented May 10, 1904.

UNITED STATES PATENT OFFICE.

WILLIAM A. F. McCALLUM, OF PHILADELPHIA, PENNSYLVANIA, ASSIGNOR TO HENRY C. SCHMIDT, OF PHILADELPHIA, PENNSYLVANIA.

APPARATUS FOR DRAWING LIQUIDS.

SPECIFICATION forming part of Letters Patent No. 759,827, dated May 10, 1904.

Application filed January 13, 1904. Serial No. 188,825. (No model.)

*To all whom it may concern:*

Be it known that I, WILLIAM A. F. McCALLUM, a citizen of the United States, residing at Germantown, in the city of Philadelphia, in the county of Philadelphia and State of Pennsylvania, have invented certain new and useful Improvements in Apparatus for Drawing Liquids, of which the following is a specification.

My invention has relation to an apparatus for drawing liquids, and in such connection it relates to the construction and arrangement of such an apparatus.

The principal object of my invention is to provide in an apparatus for drawing liquids a receptacle supported adjacent to and on substantially the same plane as the barrel, cask, keg, or other source of supply containing the liquid to be drawn, an inlet at the base of the receptacle communicating with the source of supply, so as to permit the liquid to flow into the receptacle to a level with the liquid in the source of supply, a check-valve arranged in the liquid-inlet of the receptacle, an outlet-pipe leading from the base of the receptacle to the place where the liquid is to be dispensed, a source of compressed air and an inlet therefor leading into the top of the receptacle, and a valve controlling the compressed-air inlet and arranged so as to either permit the compressed air to enter the receptacle above the liquid or to cut off the supply of air to the receptacle and at the same time permit of the discharge of compressed air from the receptacle to the exterior of said receptacle.

The nature and scope of my invention will be more fully understood from the following description, taken in connection with the accompanying drawings, forming part hereof, in which—

Figure 1 is a front elevational view, with the cask in section, of a liquid-drawing apparatus embodying main features of my invention. Fig. 2 is a sectional view, enlarged, of the receptacle for the liquid and of the inlets and outlets thereof; and Fig. 3 is an enlarged sectional view of the valve controlling the inlet of compressed air to the receptacle.

Referring to the drawings, $a$ represents a cask, barrel, or similar vessel for the liquid to be dispensed, and $a'$ represents the draw-off cock or spigot therefor. Adjacent to the cask $a$ is arranged a receptacle $b$, the walls of which by preference are made of glass for easy inspection of the contents and height of liquid in the receptacle $b$. This receptacle $b$ is so supported that it rests at its base upon the same plane as the base of the cask $a$. The bottom of the receptacle $b$ has an opening $b'$ for the passage of liquid from the cask $a$ to the receptacle, as well as for the passage of liquid from the receptacle $b$ to a draw-off pipe $d$. A coupling $e$, having end screw-threaded openings $e'$ and $e^2$ and an intermediate screw-threaded opening $e^3$, serves to connect the outlet end of the spigot $a'$ with the inlet-opening $b'$ and the inlet-opening $b'$ with the draw-off pipe $d$, as clearly shown in Fig. 2. Below the opening $e^3$ within the coupling $e$ is arranged a valve-seat $e^4$, normally closed by a check-valve $e^5$. The valve $e^5$ is raised by the flow of liquid from the spigot $a'$ into the inlet $b'$ of the receptacle $b$ and is closed upon its seat $e^4$ to stop the flow of liquid into the receptacle $b$ when the liquid is to be forced under pressure out of the receptacle $b$ into the draw-off pipe $d$, as hereinafter explained. Beneath the bar A is arranged a source of compressed-air supply B, communicating by the pipe $g$, through the valve or cock $g'$ and pipe $g^2$, with an inlet $g^3$, located at the top of the receptacle $b$. The valve $g'$ is constructed substantially as illustrated in Fig. 3—that is to say, the plug of the valve $g'$ has a diametrical opening or port $g^4$, adapted when the handle $g^5$ of the valve $g'$ is turned from right to left to open communication between the pipes $g$ and $g^2$. On the periphery of the plug of the valve $g'$ is cut a recess or slot $g^{10}$, terminating at one end in the port $g^4$ and adapted when the valve $g'$ is turned to the position indicated in Figs. 1 and 3 to form a communication between the pipe $g^2$ and a port $g^6$ in the shell of the valve $g'$, which port $g^6$ discharges into the open air.

The operation of the apparatus is as follows: With the spigot $a'$ opened liquid flows from the cask $a$ through the coupling $e$, lifting the check-valve $e^5$ and entering the receptacle $b$ through the inlet $b'$. The fluid rises in the receptacle $b$, as well as in the draw-off pipe $d$, until it reaches a level corresponding to the level of liquid in the cask $a$. While the liquid is passing from the cask $a$ to the receptacle $b$ the valve $g'$ is turned to the position indicated in Figs. 1 and 3, in which position communication between the source B of compressed air and the top of the receptacle $b$ is cut off. When liquid is to be drawn off from the pipe $d$, the valve $g'$ is turned so that its port $g^4$ forms a communication between the pipes $g$ and $g^2$, and hence compressed air flows through these pipes $g$ and $g^2$ from the source B into the receptacle $b$ above the liquid in the receptacle. The pressure of air upon the liquid in the receptacle $b$ serves not only to force the liquid through and out of the draw-off pipe $d$, but also serves to seat the check-valve $e^5$ upon its seat $e^4$ to close the inlet of liquid from the cask $a$ into the receptacle $b$. When sufficient liquid is forced under air-pressure out of the pipe $d$, the valve $g'$ is turned to not only shut off the supply of compressed air to the receptacle $b$, but also, as illustrated in Fig. 3, to permit the escape of the compressed air in said receptacle into the open air through the exhaust-port $g^6$ in the shell of the valve $g'$. When this occurs, the check-valve $e^5$ will be raised by the inflowing liquid passing from the cask $a$ through the coupling $e$ into the receptacle $b$, and the liquid will be permitted to thus flow until the liquid in the draw-off pipe $d$, receptacle $b$, and cask $a$ is at the same level.

Having thus described the nature and object of my invention, what I claim as new, and desire to secure by Letters Patent, is—

1. In an apparatus for drawing liquids, a receptacle provided at its base with a coupling divided into two branches, whereof one is connected with a source of liquid-supply, and whereof the other is connected with a liquid-dispensing means, a source of compressed air communicating with the top of said receptacle, and a valve located in said coupling for controlling the flow of liquid from the receptacle to the dispensing means.

2. In an apparatus for drawing liquids, a receptacle supported adjacent to and on substantially the same plane as the barrel or other source of supply containing the liquid to be drawn and provided with a coupling divided into two branches, whereof one communicates with the source of supply to permit the liquid to flow into the receptacle to substantially a level with the liquid in the source of supply and the other to flow to the liquid-dispensing means, a check-valve arranged in said coupling and normally controlled by the liquid in said receptacle, a source of compressed air and an inlet therefor leading into the top of said receptacle and a valve controlling the compressed-air inlet and arranged to either permit the compressed air to enter the receptacle above the liquid or to cut off the supply of air to the receptacle and also to permit of the discharge of the compressed air from the receptacle.

3. In an apparatus for drawing liquids, a source of liquid-supply, a receptacle supported adjacent to and on substantially the same plane as the barrel or other source of supply containing the liquid to be drawn and provided with a coupling divided into two branches, whereof one communicates with the source of supply to permit the liquid to flow into the receptacle to a level with the liquid in said supply and whereof the other permits of the flow of the liquid to dispensing means, a check-valve arranged in said coupling and controlled by the discharge of liquid from said receptacle, a source of compressed-air supply, a pipe connecting the air-supply with the top of the receptacle, and a valve controlling the compressed-air inlet and arranged so as to either permit the compressed air to enter the receptacle above the liquid or to cut off the supply of air to the receptacle and also to permit of the discharge of compressed air from the receptacle.

In testimony whereof I have hereunto set my signature in the presence of two subscribing witnesses.

WILLIAM A. F. McCALLUM.

Witnesses:
J. WALTER DOUGLASS,
THOMAS M. SMITH.